Aug. 15, 1967    J. A. SUTTON ETAL    3,335,516
SINKER RELEASE
Filed Jan. 7, 1965

John A. Sutton
Monroe W. Miller
INVENTORS

BY Clarence A. O'Brien
and Harvey B. Jacobson
Attorneys

United States Patent Office 3,335,516
Patented Aug. 15, 1967

3,335,516
SINKER RELEASE
John A. Sutton, 754 SW. Coast Highway, and Monroe W. Miller, 358 SW. 1st St., both of Newport, Oreg. 97365
Filed Jan. 7, 1965, Ser. No. 424,040
3 Claims. (Cl. 43—43.12)

ABSTRACT OF THE DISCLOSURE

Fishing tackle, namely, a leader, a fishing line and a complemental wire link having eyes at the ends thereof joined to and connecting the line and leader. This link embodies resilient ring-like collars by way of which sinkers (discardable spark plugs if desired) are releasably attached. Each normally contracted collar encircles and clampingly grips an end portion of the oriented sinker and circumferentially expands when the fish takes the hook and a longitudinal straining force is applied to the collar by a pull on the line.

This invention relates to a pull actuated sinker release which can be properly interposed between and connected with adjacent ends of a hook-equipped leader and fishing line and has to do, more particularly, with an improved sinker release which is novel in construction and functions in a unique manner.

One object of the present invention is to provide a simple but practical sinker carrier and release which functions to effectively and reliably retain the sinker (or sinkers) on the line but comes into play and responds to release and detach the sinker at the first strike of the fish. Accordingly, the hooked fish is seldom lost.

Another object of the invention is to provide a sinker release which is such in construction that the sinker is attached and held in place by a circumferentially expansible and contractible spring coil, the latter constituting and providing a yieldable sinker encircling friction-retaining collar.

A further object of the invention is to provide a sinker release which can be and preferably is constructed from a simple and economical length of stainless spring steel wire fashioned into a link, the latter having line and leader attaching eyes at its ends and a plurality of pull controlled sinker attaching and releasing collars intermediate its ends.

A still further object of the invention is to provide a link of the above construction possessed of the unique capability of utilizing discarded or used spark plugs as sinkers, whereby to permit the link to be loaded and weighted to comply with the contemplated needs of the fisherman.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
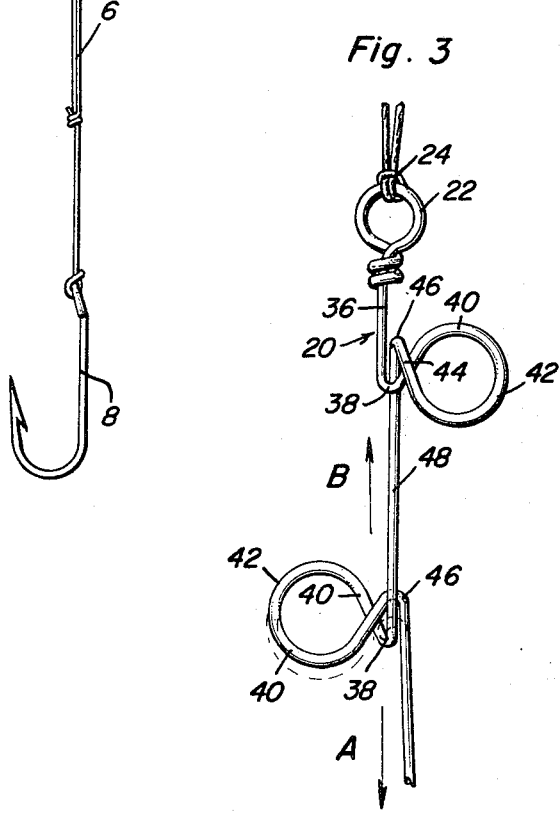
Figure 4:
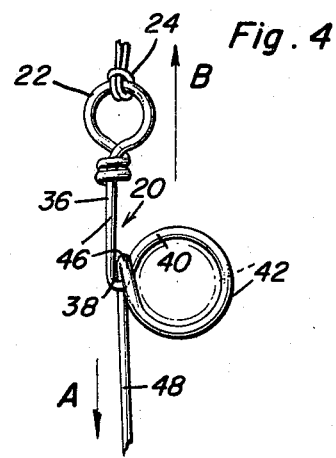

FIGURE 3 is an enlarged view of the improved sinker release with a portion thereof omitted and showing in particular how the specially formed spring coils serve as expansible and contractible sinker attaching and releasing collars; and FIGURE 4 is a view of a fragmentary type showing the manner in which one of the collars is expanded and enlarged in a manner to free the spark plug when a pull is exerted on the line in the direction of the arrows.

Figure 1:
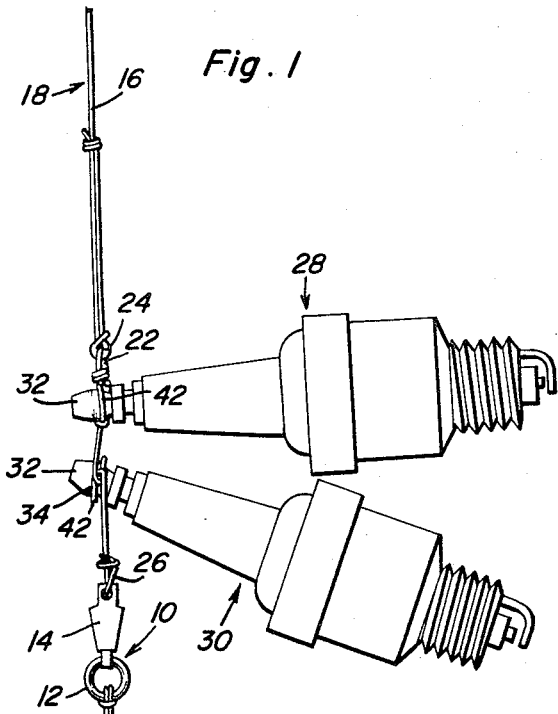
FIGURE 1 is a view in elevation showing fishing tackle rigged to include the improved sinker release which, as evident, serves to accommodate sinkers in the form of used spark plugs.
Figure 2:
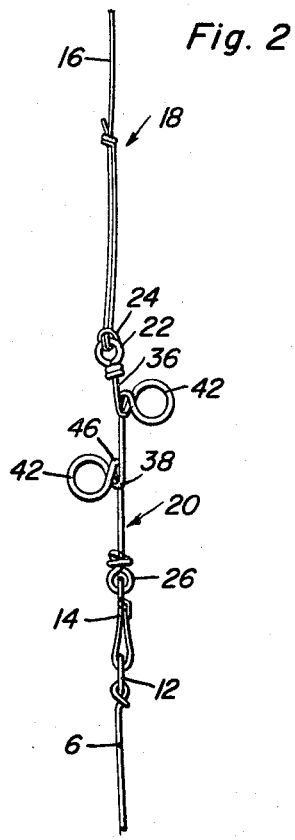
FIGURE 2 is a view similar to FIGURE 1 but showing the sinker release before the sinkers (spark plugs) are attached.

With reference to FIGURES 1 and 2 in particular the leader is denoted at 6 and is provided on its lower end with a fish hook 8, the upper end being connected to fastening means 10 embodying a ring 12 and a ring attaching clip 14. The lower end portion 16 of the fishing line 18 is attached to the upper end of the improved sinker release 20.

The sinker release is fashioned from a suitable length of stainless steel wire possessed of the desired bendable and resilient properties. More specifically, this sinker release comprises an appropriately elongated link whose upper end is provided with an eye 22 to which the end portion of the fishing line is attached as at 24. A similar eye 26 is provided at the lower end and the leader fastening cleat or clip 14 is attached thereto. Thus, the link connects the adjacent ends of the leader and fishing line.

The link shown embodies two correspondingly constructed sinker attaching and releasing adapters each of which comprises a circumeferentially expansible and contractible (normally contracted) collar. This collar is constructed and adapted to accommodate a sinker which in the disclosed arrangement comprises a used spark plug. Two such spark plugs are shown in FIGURE 1 and one of these is denoted at 28 and other one at 30. The terminal attaching end of the spark plug is provided as usual with a headed portion 32 having a truncated conical portion defining a circumferential rib 34. The adapter or collar in each instance is constructed to yieldingly encircle the ribbed portion of the head and to frictionally and retentively grip the same in the manner shown in FIGURE 1.

Each plug attaching and releasing adapter or collar is the same in construction and the description of one will suffice for both. The adapter takes the form of a simple laterally offset spring coil. To accomplish the result desired the shank portion 36 is bent upon itself as at 38 and is curved outwardly and away from the bend 38 as at 40 and formed into a ring-like collar 42. The end portions of the collar adjacent to the shank are crossed over each other as at 44 and a return bend is provided at 46 and is joined with the adjacent shank portion 48. By crossing the ends 40 and 44 and reversing the bent portions 38 and 46 the desired interlock and spring loaded collar is formed. The upper collar shown in FIGURE 3 is in its normal contracted state. The lower collar to the left in the same figure is shown contracted in full lines and expanded in phantom lines.

The inherent resiliency, shape and size of the adapter collar is such that the headed end portion 32 of the spark plug can be forced through the collar in a manner that the collar then yieldingly encircles and frictionally grips and holds the head in place in the manner shown in FIGURE 1.

In practice and assuming that the line had been rigged by attaching the spark plugs or sinkers 28 and 30 to sinker carrying and releasing link 20 the tackle is ready for use in the customary or usual manner. The inherent resiliency of each collar causes the same to yieldingly embrace and frictionally hold the attached end of the sinker in place. While each thus constructed collar has the capability of gripping and retaining the sinker it also possesses the desired capability of releasing the sinker (or sinkers) at the instant of the first strike of the fish. This is the same when the fish takes the hook and exerts a pull on the leader and link in the direction of the arrow A in FIGURE 3 and the fisherman simultaneously tautens and maintains a pull on the line in the direction of the arrow B, the bent and crossed ends of the collar permit the same to expand radially and release the sinker.

This invention obviates the need for conventional-type sinkers and make practical the use of throw-away spark plugs. While two spark plugs have been shown as exemplary of the concept, it is within the purview of this invention to provide a longer link and additional adapter collars (not shown) to accommodate from one to four plugs thus affording the fisherman a range of weight from 2½ ounces to 10 ounces. Actual use of the invention has proved out to be feasible and successful. In fact, by using a waste object (used spark plug) the fisherman saves many times the cost of the sinker release. Most service stations and automotive garages have an accumulation of old spark plugs on hand and are more than pleased to give them to their customers. It follows that the pleasure of playing and landing the fish is enhanced in that when the sinker weights are dropped from the release no hampering gear exists between the fisherman and the hooked fish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pull actuated sinker carrier and release comprising a length of resilient steel wire constituting and providing a link, the respective terminal end portions of said link having line and leader attaching and connecting eyes, portions of said link between said eyes being bent upon themselves and providing a plurality of circumferentially contractible and expansible, normally contracted, spring coils each providing a sinker encircling, attaching and releasing collar, said collars being adapted to yieldingly but frictionally grip a portion of an attachable and detachable sinker, and being automatically expanded to disengage and release the attached sinker as a result of a strike and a resulting steady pulling force which is simultaneously applied and imposed on the line.

2. A pull actuated sinker release comprising a length of resilient steel wire constituting and providing a line and lead connecting link, a median shank portion of said link being bent and looped upon itself and formed into a normally contracted but circumferentially expansible spring coil, said coil having end portions thereof crossing each other and joined to coacting portions of said shank portion by oriented interlocking reversed bends, whereby to provide a sinker gripping pull released collar.

3. Fishing tackle comprising, in combination, a leader having a fishhook attached to one end thereof, a companion fishing line, an elongated resilient link having a first eye at an upper end to which the lower end of said fishing line is connected, a second eye at its lower end joined by fastening means to an upper end of said leader, a readily attachable and releasable sinker having a headed portion at one end, said link being formed with reversely bent portions providing a resilient, self-contained, ring-like sinker attaching and releasing collar, said collar being normally contracted but circumferentially expansible and clampingly but releasably encircling said headed end portion, frictionally gripping said headed end portion and being adapted to expand and release said sinker when a longitudinal straining force is applied and imposed on said link by a steady pull exerted on the fishing line.

References Cited

UNITED STATES PATENTS

| | | | |
|---|---|---|---|
| 2,256,173 | 9/1941 | Schechterle | 43—42.04 |
| 2,275,869 | 3/1942 | Seaton | 43—42.04 |
| 2,326,876 | 8/1943 | Miller | 43—43.12 |
| 2,481,346 | 9/1949 | Rigby | 43—44.95 X |
| 2,518,634 | 8/1950 | Peterson | 43—44.92 X |
| 2,735,212 | 2/1956 | Baum | 43—43.12 |
| 3,057,108 | 10/1962 | Jacobsen | 42—42.72 X |
| 3,081,574 | 3/1963 | Wise | 43—43.12 |
| 3,177,606 | 4/1965 | Benoit | 43—42.72 X |

SAMUEL KOREN, *Primary Examiner.*

WARNER H. CAMP, *Assistant Examiner.*